United States Patent [19]

Schaffer

[11] Patent Number: 4,928,104

[45] Date of Patent: May 22, 1990

[54] WIDEBAND MULTI-CHANNEL DIGITAL RADIO FREQUENCY MEMORY

[75] Inventor: Timothy J. Schaffer, Eldersburg, Md.

[73] Assignee: Westinghouse Electric Corp., Pittsburgh, Pa.

[21] Appl. No.: 288,850

[22] Filed: Dec. 23, 1988

[51] Int. Cl.⁵ ............................................... G01S 7/38
[52] U.S. Cl. ...................................................... 342/15
[58] Field of Search .................... 342/14, 15, 13, 89, 342/98, 175; 365/45

[56] References Cited

U.S. PATENT DOCUMENTS

| | | |
|---|---|---|
| 3,947,827 | 3/1976 | Dautremont, Jr. et al. |
| 3,991,409 | 11/1976 | Dautremont, Jr. et al. |
| 4,314,248 | 2/1982 | White ................................. 342/14 |
| 4,713,662 | 12/1987 | Wiegand ............................. 342/13 |
| 4,743,905 | 5/1988 | Wiegand ............................. 342/14 |

Primary Examiner—Thomas H. Tarcza
Assistant Examiner—Mark Hellner
Attorney, Agent, or Firm—W. G. Sutcliff

[57] ABSTRACT

A multiplexed multi-channel DRFM is disclosed including at least one input and output mixer, D/A and A/D conversion means and a random access memory for receiving digital representations of the incoming RF pulse. A channel detector responsive to the frequency of the incoming pulse and an N channel switch responsive to the channel detector selectively connects one of a plurality of local oscillators to the DRFM mixers as the frequency of the incoming RF pulse changes with time.

9 Claims, 2 Drawing Sheets

WIDEBAND MULTI-CHANNEL DIGITAL RADIO FREQUENCY MEMORY

BACKGROUND OF THE INVENTION

This invention relates, in general, to coherent radio frequency memories (CRFM) and, more specifically, to digital radio frequency memories (DRFM) suitable for use in radar countermeasures equipment.

Active jammers are used in the field of electronic countermeasures to confuse or counter the system originating radar signals. In some situations, it is desirable to return signals to the radar system which are exact copies of the arriving radar signal. In other situations, it is desirable to return signals to the radar system which have characteristics other than that of the received radar signal in order to further confuse the radar system. In any event, it is usually necessary for the countermeasures system to store the received radar signal and reproduce it at a later time.

Previously, delay lines of various types have been used to effectively store the received radar signal for a short period of time and make the stored radar signal available at a later time. One disadvantage of a delay line is that the delay cannot be electronically changed easily. It is also difficult to obtain reasonably long delay periods because the delay line signal degrades and the equipment is bulky. An improvement over the delay line technology has been achieved by the use of digital radio frequency memories (DRFMs) which convert relatively high radio frequency (RF) signals down to a lower intermediate frequency (IF) by mixing the RF with a local oscillator (LO) signal for storage in a digital memory device. The digital memory can be controlled in a manner similar to the digital memory of a computer and the stored value representing the radar signal can be recalled at RF at any time delay desired. Further, manipulation of the digital values to produce changes in the replicated signal are also conveniently done by the digital processes.

Digital systems work by sampling the incoming signal at a selected sampling rate. The higher the frequency of the incoming signal the higher sampling rate necessary to fully characterize the signal in digital form. The maximum usable instantaneous bandwidth (IBW) of a DRFM is one-half the sampling rate of the sampling devices, e.g., analog-to-digital (A/D) and digital-to-analog (D/A) converters used in the DRFM to move into and out of the digital domain, based upon the limitations governed by the Nyquist Sampling Theory.

Typically, to improve the amplitude dynamic range of the DRFM, to maximize instantaneous bandwidth and to minimize the digital storage bit requirement needed, one bit sampling and replication techniques are used in most DRFMs. One bit sampling involves sampling the incoming signal to determine the signal polarity (positive or negative) at each sample point. However, even with the instantaneous bandwidth provided by one bit sampling it is possible that the incoming signal may have a frequency spectrum which exceeds the instantaneous bandwidth of the DRFM. When this happens part of the incoming signal is lost. In order to handle a wider operating frequency range it is possible to employ multiple down conversion local oscillators. These oscillators provide the local oscillator signal near the frequency of the incoming signal. However, once the local oscillator is selected it is not switched until the next incoming pulse. Thus, if the operating frequency of the incoming pulse is wide, part of another signal may be lost.

SUMMARY OF THE INVENTION

The present invention comprises a DRFM employing a plurality of N local oscillators and an N channel switch which couples the local oscillators to the DRFM. A channel detector responsive to the changing frequency of the incoming RF signal causes the N channel switch to select the appropriate local oscillator in order to maintain the instantaneous bandwidth of the system within the limits of the sampling or conversion apparatus.

DESCRIPTION OF THE INVENTION

Figure 1:
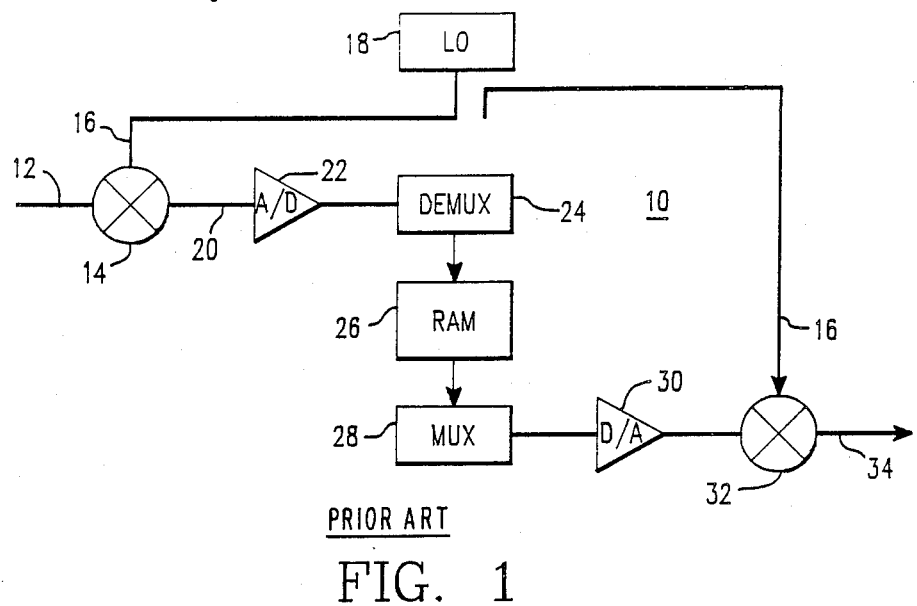
FIG. 1 is a block diagram of a typical single channel DRFM.

In FIG. 1 a single channel DRFM is disclosed in schematic block form. The arrangement is similar in operating principle to the system described in Wiegand's Pat. No. 4,713,662 assigned to Westinghouse Electric Corporation, the assignee herein. According to FIG. 1 an incoming RF pulse 12 is mixed in a mixer 14 with a local oscillator signal (LO) 16 provided by local oscillator 18. The LO signal 16 may be frequency or phase modulated as described in Wiegand's patent. The resulting output of the mixer 14 is an intermediate frequency IF signal 20 which represents the difference frequency between the RF input 12 and the LO signal 16. If, for example, the RF signal 12 is 3100 MHz. and the LO signal 16 is 3000 MHz., the IF signal 20 is 100 MHz. which is well within the instantaneous bandwidth of currently available conversion equipment. The IF signal 20 is converted or sampled by the analog-to-digital converter (A/D) 22 and the data is demultiplexed or buffered by demux unit 24 to speeds that can be handled by the high speed random access memory or RAM 26. The signals are stored in RAM in accordance with known techniques. At some later time when a false return signal is to be generated, the data from the RAM is retrieved and multiplexed in multiplexer 28, reconverted by digital-to-analog (D/A) converter 30 and mixed in the mixer 32 with the (possibly) modulated LO signal 16 to produce the output RF pulse 34.

Typically, the incoming RF pulse 12 has a wide range of pulse widths, from relatively short to relatively long time duration anywhere from less than a microsecond to milliseconds. For the longer pulses the frequency of the incoming RF signal 12 may be rapidly changed or modulated so that the frequency spectrum of the RF pulse 12 is many times the instantaneous bandwidth of the system. If, for example LO signal 18 is 3000 MHz., and the frequency of the incoming pulse changes from 3100 MHz. to 3600 MHz., the intermediate frequency 20 will change from 100 to 500 MHz. This range is about the instantaneous bandwidth limit of currently available conversion equipment. If the incoming RF pulse 12 has a wider frequency spectrum, the bandwidth of the system may be exceeded. Consequently, some of the signal will be lost.

In prior art systems, where multiple local oscillators 18 are employed, only one oscillator is employed at any one time. Accordingly, if the incoming RF signal 12 has a given frequency, the appropriate local oscillator is selected over the entire duration of the incoming pulse 12. Thus, some incoming signal information is unavailable. When this happens the input pulse 12 may not be accurately replicated, thereby reducing the effectiveness of the countermeasure system.

Figure 2:
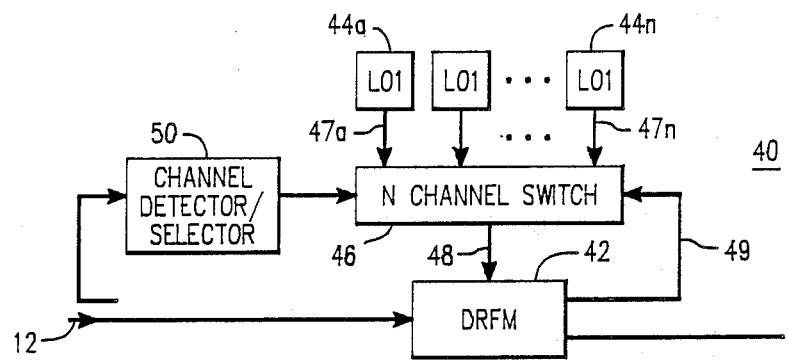
FIG. 2 is a block diagram of a multi-channel DRFM according to the present invention.

FIG. 2 illustrates a multiple channel DRFM 40. In the arrangement illustrated, incoming RF pulse 12 is input to the DRFM 42. It should be understood that the DRFM 42 is similar to the arrangement of FIG. 1. In the arrangement of FIG. 2, a plurality of local oscillators LO's 44a–44n are employed. An N channel switch 46 (including, for example, an FET gate or gated diode, not shown, for each channel) is connected to each respective output 47c–47n of the local oscillators 44a–44n, and the output 48 of the N channel switch is connected to the mixers (not shown) but see mixer 14 above in the DRFM 42 in a manner similar to the arrangement of FIG. 1. A channel detector/selector 50 is coupled to the N channel switch 46 for selectively gating the N channel switch 46 to connect any one of the local oscillators 44a–44n to the DRFM 42. The channel detector 50 is responsive to the frequency of the incoming RF pulse 12.

In accordance with the present invention, the channel detector/selector 50 selects an appropriate local oscillator upon detection of the initial RF pulse 12. As the frequency of the RF pulse 12 changes beyond the instantaneous bandwidth of the DRFM 42, the channel detector/selector 50 selects the correct local oscillator to supply the DRFM 42 intermediate frequency in FIG. 1. In this way the entire input RF pulse 12 is detected and captured.

Figure 3:
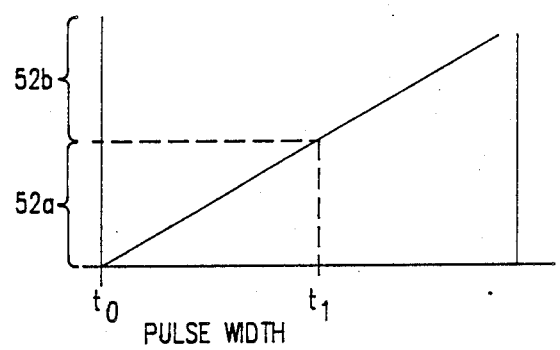
FIG. 3 is an illustration of the frequency over time of a possible incoming RF signal.

FIG. 3 illustrates in graphical form an RF pulse 12 in terms of time (pulse width) verses frequency. The RF pulse 12 has a frequency F which increases over time. If between time $t_0$ and $t_1$ the RF pulse 12 has an initial frequency, for example, between 2900 and 3100 MHz. and the local oscillator 44a has a frequency of 3000 MHz., then the instantaneous bandwidth 52a is about 100 MHz. or less. If, however, the frequency F exceeds 3100 MHz. the bandwidth exceeds the instantaneous bandwidth of the DRFM. In accordance with the present invention, as the frequency F increases beyond 3100 MHz., for example at time $t_1$, the channel detector/selector 50 causes the N channel switch 46 to select the next local oscillator 44b which may have an operating frequency at 3200 MHz. which will allow the system to have an intermediate frequency within the instantaneous bandwidth 52b of 100 MHz. If the frequency decreases the N channel switch can select local oscillator 44a. Likewise, if the frequency continues to increase over the duration of the RF pulse 12 the N channel switch 46 can select any local oscillator 44N.

Input RF pulse 12 carrier is shown as being modulated by a ramp in FIG. 3. However, any wave form may be accommodated, including continuous (CW), exponential and step functions, as long as switching occurs so that the system operates within the instantaneous bandwidth of the converters. For purposes of explanation of the present invention, it is important that the system is capable of responding to the frequency of the RF pulse 12 so that the entire pulse may be stored in the DRFM and replicated at a later time.

Figure 4:
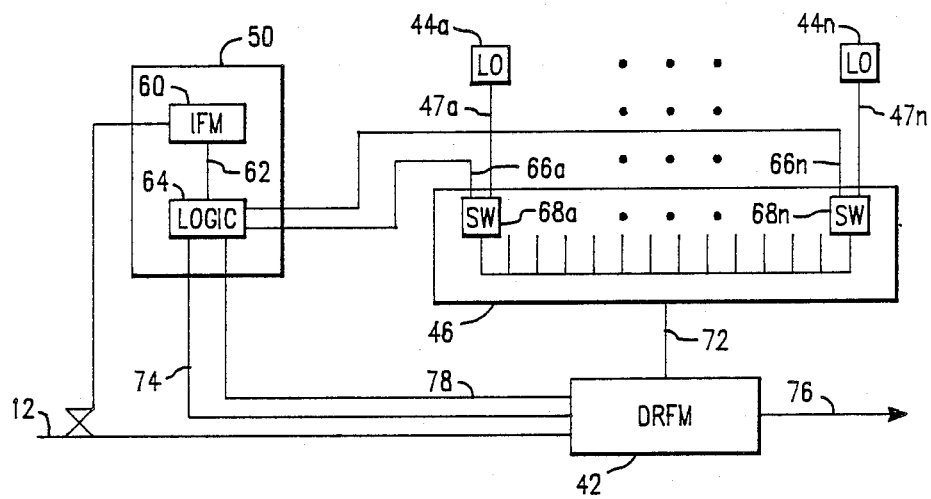
FIG. 4 is a schematic block diagram in greater detail of an implementation of apparatus for gating multiple frequency inputs to the DRFM.

As illustrated in FIG. 4, the channel detector/selector 50 may include a broad band instantaneous frequency measuring (IFM) device or receiver 60 which is responsively coupled to the RF input 12. The IFM 60 produces an output 62 in digital form which represents the frequency of the RF input 12. Selection logic 64 produces outputs 66a–66n which are connected to individual switches (SW) 68a–68n in the N channel switch 46. The local oscillators (LO) 44a–44n produce outputs 70a–70n which are connected to respective ones of the switches 68a–68n as shown. When, for example, a logic output 66a of selection logic 64 gates switch 68a on, the output 47a of the local oscillator 44a is gated to the DRFM 42 over switch output 72. As can be readily appreciated, the switch output 78a is connected to an input mixer (not shown but which is similar to the input mixer 14 in FIG. 1).

The selection logic 64 also produces output 74 which is coupled to the DRFM 42. The output 74 may be a serially or parallel coupled word which identifies the particular local oscillator that was selected at that time. At some later time when the DRFM 42 replicates the input 12 at its output 76, it calls up from memory information as to what local oscillator 44a–44n was selected and produces a control signal 78 which may be coupled to the logic 64 for gating the switches 68a–68n to thereby connect the correct local oscillator 44a–44n to the output mixer (not shown) for replicating the output signal 76. The output mixer 32 in FIG. 1 serves a similar purpose.

Other arrangements are possible as well for the detector selector 50. For example, a channelized receiver may be substituted for the IFM 60 and logic 64 to produce gating signals for the switches 68a–68n. Appropriate circuitry may be provided to carry digital information to the DRFM 42 which identifies the particular switch 68a–68n which was selected to thereby enable it to replicate the signal at a later time.

While the invention has been described in connection with specific embodiments thereof, it will be understood that it is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A digital radio frequency memory suitable for use as a coherent radio frequency memory in a military electronic countermeasure system, said memory comprising:

a plurality of RF local oscillators for producing local oscillator signals of different frequencies;

a first mixer for selectively converting an RF input signal and one of said local oscillator signals into an intermediate frequency signal within a selected instantaneous bandwidth;

an analog-to-digital (A/D) converter for converting the IF signal into digital values;

a digital memory for storing said digital values for later retrieval;

a digital-to-analog (D/A) converter for converting the retrieved digital values into an analog signal;

a second mixer for converting the analog signal and said selected local oscillator signal into an RF output signal which replicates the RF input signal;

a channel detector responsive to the frequency of the RF input signal for producing gate outputs for selected frequency ranges;

and a channel selector switch connected to the local oscillators and the channel detector for selecting a local oscillator in accordance with the gated output of the frequency detector, said channel detector causing the channel selector switch to select a different oscillator in accordance with a gated output when the instantaneous bandwidth of the DRFM would otherwise be exceeded.

2. The DRFM of claim 1 wherein the A/D and D/A converters operate at a selected sampling rate and the instantaneous bandwidth of the DRFM is a function of the sampling rate.

3. The DRFM of claim 1 wherein the channel selector switch is a gated RF switch and the channel detector is a filter having selectable outputs for gating the RF switch.

4. A method for storing in a digital radio frequency memory (DRFM) an input RF signal for replication at a later time including the steps of:

mixing at least one selectable local oscillator signal and the input RF signal to produce an input IF signal;

converting the IF signal to digital values at a sampling rate indicative of an instantaneous bandwidth of the DRFM;

storing the digital values in the digital memory;

retrieving the digital values from the digital memory;

converting the retrieved digital value into an output signal;

detecting the frequency of the RF signal and selectively changing the frequency of the local oscillator signal whenever the frequency of the input IF signal exceeds the instantaneous bandwidth of the DRFM.

5. A digital radio frequency memory suitable for use as a coherent radio frequency memory in a military electronic countermeasure system, said memory comprising:

a plurality of RF local oscillators for producing local oscillator signals of different frequencies;

a first mixer for selectively converting an RF input signal and one of said local oscillator signals into an intermediate frequency signal within a selected instantaneous bandwidth;

an analog-to-digital (A/D) converter for converting the IF signal into digital values;

a digital memory for storing said digital values for later retrieval;

a digital-to-analog (D/A) converter for converting the retrieved digital values into an analog signal:

a second mixer for converting the analog signal and said selected local oscillator signal into an RF output signal which replicates the RF input signal;

a receiver responsive to the frequency of the RF input for producing outputs indicative of frequency ranges of said RF input;

selection logic means responsive to the receiver outputs for producing a logic output for each frequency range;

switch means responsively coupled to each logic output and the local oscillators for connecting one of the local oscillators to the first mixer in accordance with a logic output corresponding to the frequency range of the RF input, said switch means responsive to a different logic output to connect a different local oscillator to the first mixer in accordance with a logic output corresponding to different frequency range of the RF input.

6. The DRFM of claim 5 wherein said digital memory is coupled to the selective logic for storing the outputs thereof corresponding to the different frequency ranges; and said switch means is responsively coupled to the memory for connecting the local oscillators to the second mixer in an order corresponding to frequency ranges occuring in the input RF.

7. The DRFM of claim 5 wherein the receiver comprises an instantaneous frequency measuring receiver.

8. The DRFM of claim 5 wherein the receiver comprises a filter bank.

9. A method for storing in a digital radio frequency memory (DRFM) means which includes means for providing a local oscillator signal, an input RF signal for replication at a later time including the steps of:

detecting the frequency of the RF signal and selectively changing the frequency of the local oscillator signal whenever the frequency of the input (IR) RF signal exceeds an instantaneous bandwidth of the DRFM;

providing an local oscillator signal of a selected frequency;

mixing the selected local oscillator signal and the input RF signal to produce an input IF signal;

converting the IF signal to digital values at a sampling rate indicative of said instantaneous bandwidth;

storing the digital values in the digital memory;

retrieving the digital values from the digital memory;

converting the retrieved digital value into an analog IF signal; and mixing the selected local oscillator signal with the analog IF signal to produce an output RF signal which is a replica of the input RF signal.

* * * * *